(No Model.)

H. R. SAVAGE.
CREAM SKIMMING DEVICE.

No. 361,720. Patented Apr. 26, 1887.

Witnesses:
T. H. Parsons.
J. R. Drake.

Hiram R. Savage,
Inventor, by
J. R. Drake,
Atty.

UNITED STATES PATENT OFFICE.

HIRAM R. SAVAGE, OF SARDINIA, NEW YORK.

CREAM-SKIMMING DEVICE.

SPECIFICATION forming part of Letters Patent No. 361,720, dated April 26, 1887.

Application filed July 8, 1886. Serial No. 207,438. (No model.)

*To all whom it may concern:*

Be it known that I, HIRAM R. SAVAGE, a citizen of the United States, residing at Sardinia, in the county of Erie and State of New York, have invented certain new and useful Improvements in Cream-Skimming Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to automatically skim milk and draw off the cream from the top, (without using dippers, skimmers, &c.,) and by which milk is prevented running in with the cream and time saved.

Figure 1:
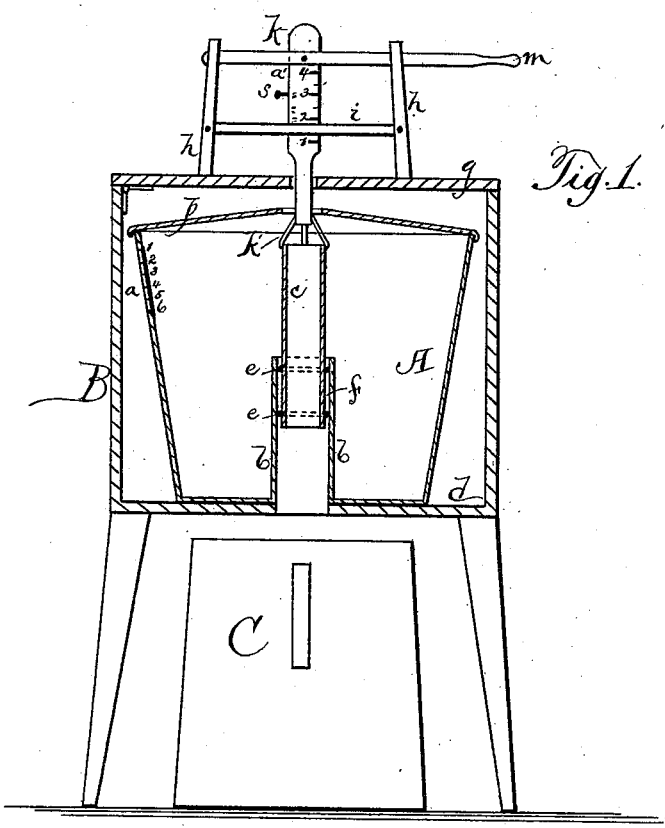
Figure 2:
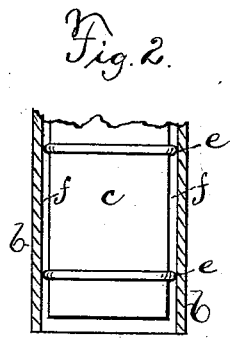
Figure 3:
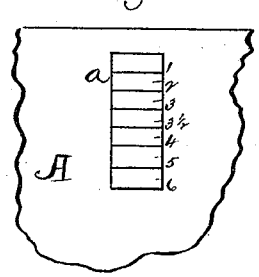

The invention as constructed and applied will be understood by reference to the following specification and claims:

In the drawings, Figure 1 is a sectional view of the whole device; Fig. 2, detail of tubes in section and rubber-ring packing; Fig. 3, detail of pail-gage.

A represents a pail or receptacle holding milk for raising cream, and having a cream-gage, $a$, on the side.

$b$ is a permanent central tube open clear through and ending about midway in the pail, as shown. Inside this is another open tube, $c$, sliding up and down therein. The necessary tight connection is made by two round rubber rings $e\,e$, set around the tube $c$, leaving an air-space, $f$, between the rings, preventing water coming between the tubes when set in a cooler or milk passing down when set for cream.

The pail A is set on the bottom or shelf $d$ of a wooden stand, B, which has also a central opening therein corresponding to the opening of the tube $b$, the object to be presently explained.

On the top of the stand B is a simple frame-work fastened thereto, consisting of uprights, $h\,h$, a central guide, $i$, and a vertically-acting pressure-bar or plunger, $k$, operated by a pivoted handle, $m$, (or by any suitable simple device,) for raising and lowering the bar, which projects through the guide $i$, table $g$, and pail-cover $p$ into the pail A. Its lower end is provided with claws or fingers $k'$, fitting on the rim of the tube $c$, as in Fig. 1. The openings are to allow the cream to run through into the tube $c$.

On the bar $k$, above the table $g$, is a gage, $a'$, figured from the bottom 1, &c., to top, in contradistinction to gage $a$ on the pail, which is marked 1 at top and numbered on down, so that when a stop or peg, $s$, is set in gage $a'$ it is for a purpose now to be explained in the operation and working, which is as follows:

The receptacle A, holding the milk, is set in the stand B, the tube $c$ being raised above the milk surface and the bar $k\,k'$ resting on the rim. When the cream has fully set, the gage $a$ is consulted, and the figure thereon which the depth of the cream reaches is noted. Then the peg $s$ is set in the bar $k$ at a figure corresponding to that on the cream-gage, and the bar pressed down by the handle $m$ as far as the peg allows, which forces down the inner tube, $c$, until it stops at the exact depth of the cream, as noted by the gage $a$, the gage $a'$ having been arranged on the bar $k$ to bring about exactness by the placing of the peg and its striking the cross-bar $i$ of the frame in accordance therewith. This causes all the cream on the surface of the milk to run from the top into the tube $c$, and down through tube $b$, bottom $d$, and into a cream-receiver, C, set beneath, (see Fig. 1,) leaving the milk standing in pail A on an exact level with the top of the tube $c$. It takes but a moment for the cream to run out, and it does not carry any milk with it. Then the pail A is taken out and another set in the stand B and treated in the same manner, and so on through any number.

As the amount of milk and cream varies at different times and in different pails, it is only necessary to set the bar-gage $a'$ by the one on the pail to get accurate results.

By ordinary skimming, &c., an amount of milk must get in with the cream, while by this device it is almost impossible. This will prove a great advantage, as when the cream-gatherer examines the gages he sees and can note the amount of cream he can depend on before it is drawn off, and when my device is used the cream obtained will correspond with his tally.

The tube $c$ is drawn up and out by hand, and is removed, so as to thoroughly clean the parts.

I claim—

1. The combination of a milk and cream receptacle, A, having a cream-gage, $a$, the permanent open tube $b$, tube $c$, sliding therein, and the pressure-bar $k$, having fingers $k'$, in connection with said tube $c$, all substantially as and for the purpose specified.

2. The combination of a milk and cream receptacle, A, the permanent open tube $b$, and independent tube $c$ sliding therein, and the pressure-bar $k$, having a gage, $a'$, in connection therewith, said bar operated in connection with the tube $c$ by the pivoted handle $m$, all substantially as and for the purpose specified.

3. The combination, in a milk and cream receptacle, of the permanent open tube $b$, the independent tube $c$ sliding therein, the pressure-bar $k$, having fingers $k'$, operated in connection with tube $c$, the stop $s$, and cross-bar $i$, all substantially as and for the purpose specified.

4. The combination of the stand B, having an open bottom, $d$, the milk-receptacle A, provided with the gage $a$, and tubes $b$ $c$, the pressure-bar $k$, having the gage $a'$ and fingers $k'$, operated by the handle $m$, and the cream-receiver C, all substantially as and for the purpose hereinbefore fully explained.

In testimony whereof I affix my signature in presence of two witnesses.

HIRAM R. SAVAGE.

Witnesses:
J. R. DRAKE,
T. H. PARSONS.